United States Patent
Afzali-Ardakani et al.

(10) Patent No.: US 9,663,369 B2
(45) Date of Patent: *May 30, 2017

(54) CERIUM (IV) SALTS AS EFFECTIVE DOPANT FOR CARBON NANOTUBES AND GRAPHENE

(75) Inventors: Ali Afzali-Ardakani, Armonk, NY (US); Bhupesh Chandra, Armonk, NY (US); George S. Tulevski, Armonk, NY (US)

(73) Assignee: International Business Machines Corporation, Armonk, NY (US)

(*) Notice: Subject to any disclaimer, the term of this patent is extended or adjusted under 35 U.S.C. 154(b) by 1432 days.

This patent is subject to a terminal disclaimer.

(21) Appl. No.: 13/329,184

(22) Filed: Dec. 16, 2011

(65) Prior Publication Data

US 2013/0153831 A1    Jun. 20, 2013

(51) Int. Cl.
*C01B 31/02* (2006.01)
*H01B 1/04* (2006.01)
*H01J 1/304* (2006.01)
*H01J 9/02* (2006.01)
*B82Y 30/00* (2011.01)
*B82Y 40/00* (2011.01)

(52) U.S. Cl.
CPC .......... *C01B 31/0253* (2013.01); *B82Y 30/00* (2013.01); *B82Y 40/00* (2013.01); *H01J 1/304* (2013.01); *H01J 9/025* (2013.01); *H01J 2201/30453* (2013.01); *H01J 2201/30469* (2013.01)

(58) Field of Classification Search
CPC ......... B82Y 30/40; B82Y 40/00; C01B 31/02; C01B 31/04

USPC .............................................. 252/500–519.1
See application file for complete search history.

(56) References Cited

U.S. PATENT DOCUMENTS

| 5,705,049 | A | 1/1998 | Harrison |
| 6,872,681 | B2 | 3/2005 | Niu et al. |
| 7,838,159 | B2 | 11/2010 | Grobinskiy et al. |
| 2004/0043219 | A1 | 3/2004 | Ito et al. |
| 2005/0076581 | A1* | 4/2005 | Small et al. ............ 51/307 |
| 2006/0142149 | A1 | 6/2006 | Ma et al. |

(Continued)

FOREIGN PATENT DOCUMENTS

CN         101054662        10/2007

OTHER PUBLICATIONS

Tasis ("Water-Soluble Carbon Nanotubes by Redox Radical Polymerization." Macrom Rap Comm, 28, pp. 1553-1558, 2007).*

(Continued)

*Primary Examiner* — Tri V Nguyen
(74) *Attorney, Agent, or Firm* — The Law Offices of Robert J. Eichelburg

(57) ABSTRACT

A process comprises combining a Ce (IV) salt dissolved in a solvent comprising water with a carbon material comprising CNT or graphene wherein the Ce (IV) salt is selected from a Ce (IV) ammonium salt of a nitrogen oxide acid, Ce (IV) ammonium salt of a sulfur oxide acid, Ce (IV) salt of a lower alkyl organo sulfur acid, or Ce (IV) salt of a lower alkane organo sulfur acid. In one embodiment the Ce (IV) salt is selected from Ce (IV) ammonium nitrate, Ce (IV) ammonium sulfate, Ce (IV) lower alkyllsulfonate, or Ce (IV) trifluoro lower alkanesulfonate. A product is produced by this process. An article of manufacture comprises this product on a substrate.

20 Claims, 3 Drawing Sheets

(56) References Cited

U.S. PATENT DOCUMENTS

| | | | |
|---|---|---|---|
| 2008/0213367 | A1 | 9/2008 | Sarkar et al. |
| 2009/0068241 | A1* | 3/2009 | Britz et al. .................... 424/409 |
| 2009/0220767 | A1 | 9/2009 | Sclogl et al. |
| 2009/0301993 | A1 | 12/2009 | Feng et al. |
| 2010/0044317 | A1* | 2/2010 | Witham et al. ............... 210/721 |
| 2011/0086176 | A1* | 4/2011 | Yoon et al. ................. 427/443.2 |

OTHER PUBLICATIONS

Imamoto ("Ceirum(IV) Trifluoromethanesulfonate as a strong oxidizing agent." Chem Lett, pp. 1445-1446, 1990).*

Lozar ("Oxidation of o-Nitrotoluene by Cerium(IV) Methanesulfonate." Ind. Eng. Chem. Res., 34, pp. 3149-3153, 1995).*

Wang ("Stimuli-Responsive Polymer Covalent Functionalization of Graphene Oxide by Ce(IV)-Induced Redox Polymerization." JPC C, 115, pp. 24636-24641, online Nov. 16, 2011).*

Great Britain Intellectual Property Office Combined Search and Examination Report dated Apr. 26, 2013.

Nicholas Mole; Combined Search and Examination Report; Great Britain Intellectual Property Office; Apr. 26, 2013; 6pp.

J.T. Luong, et al.; Oxidatten, Deformation, and Destruction of Carbon Nanotubes in Aqueous Ceric Sulfate; J. Phys. Chem. B2005, 109, Jan. 8, 2005, pp. 1400-1407, Amer. Chem. Soc.US.

C. Li, et al., Controlable preparation of . . . materials based on ceria nanoparticles and carbon nanotubes, J. of Solid State Chemistry 181(2008) pp. 2620-2625, Jun. 24, 2008,Elsevier.

Nicholas Mole; Letter and Examination Report; Great Britain Intellectual Property Office; Jun. 26, 2014; 2pp.

Applicants' Response; Jul. 3, 2014; 2pp.

J.Chen, et al.; Self-aligned carbon nanotube transistors with charge transfer doping; App. Phys. Ltrs.; Mar. 16, 2005; pp. 1-3; 86,123108; Amer. Inst. Phys.; US.

T. Hemraj-Benny, et al.; Interactions of Lanthanide Oxides with Oxidized Single-Walled Carbon Nanotubes; Chem. Mater. 2004,16, 1855-63; Apr. 9, 2004; pp. 1855-1863; Am. Chem. Soc.; US.

H. Shiozawa, et al.; Screening the Missing Electron: Nanochemistry in Action; Phys. Rev. Ltrs.; Jan. 27, 2009; pp. 1-4; PRL 102, 046804(2009); The Amer. Phys. Soc.; US.

B. Chandra, et al.; Stable Change-Transfer Doping of Transparent Single-Walled Carbon Nanotube Films; Chem. Mater. 2010, 22, 5179-5183; Sep. 1, 2003; Am. Chem. Soc. US.

T. Durkop, et al.; Extraordinary Mobility in Semiconducting Carbon Nanotubes; Nano Letters 2004 vol. 4 No. 1, pp. 35-39;Dec. 3, 2003; Am. Chem. Soc.; US.

Aug. 18, 2014 Notice of Allowance, U.S. Appl. No. 13/329,115.

May 29, 2015 Office Action from the German Patent Office (German language version only), 7 pp.

Wang, B., et al. Stimuli-Responsive Polymer Covlent Functionalization of Graphene Oxide by Ce(IV)-Induced Redox Polymerization, The Journal of Physical Chemistry, Nov. 16, 2011, pp. 24636-24640, ACS Publications.

Luong, John H. T., et al., Oxidation, Deformation, and Destruction of Carbon Nanotubes in Aqueous Citric Acid, J. Phys. Chem. B, vol. 109, No. 4, 2005, Washington, D.C., U.S.A.; Bayerische StaatsBibliothek, Germany.

* cited by examiner

CERIUM (IV) SALTS AS EFFECTIVE DOPANT FOR CARBON NANOTUBES AND GRAPHENE

FIELD OF THE INVENTION

The field of the invention comprises dopants for carbon nanotubes and graphenes.

BACKGROUND OF THE INVENTION

Carbon nanotubes (CNTs) and graphene have attracted much attention due to their intrinsic properties as semiconductors as well as their metallic nature. Recently, the use of CNT and graphene as flexible transparent electrodes has been investigated by research and technology groups. Thin films of carbon nanotubes, which are mixtures of semiconducting and metallic nanotubes, are much more resistive than standard indium-doped tin oxide (ITO) at a certain transparency. For this reason, CNT films are doped with many different chemicals, e.g., nitric acid, thionyl chloride, organoantimnoy and the like. Nitric acid and thionyl chloride dopants are effective in reducing the sheet resistivity of CNT thin films but they are not stable and after a few days at room temperature the effect of doping is reduced and sheet resistivity approaches that of un-doped films. Additionally, the use of CNT of graphene as active elements in transistor devices is being investigated. In many cases, the devices will need to be doped to achieve the required transport properties.

RELATED ART

U.S. Pat. No. 7,253,431 describes a system and method for solution processed p-doping of carbon nanotube FETs:
U.S. Pat. No. 7,151,146 describes neodymium-carbon nanotubes prepared by a ligand-exchange reaction with a neodymium compound and carboxylated carbon nanotube (CNT):
U.S. Published Patent Application 2009/0253590 describes a method for manufacturing a carbon nanotube composition composed of tubes having a desired single chirality:
U.S. Published Patent Application 2008/0001141 describes doped nanostructure network, devices:
U.S. Pat. No. 6,891,227 describes a self-aligned carbon-nanotube field effect transistor semiconductor device consisting of carbon nanotubes deposited on a substrate, a source and a drain formed at a first end and a second end of the carbon-nanotube, respectively, and a gate formed substantially over a portion of the carbon-nanotube, separated from the carbon-nanotube by a dielectric film:
U.S. Pat. No. 7,132,714 describes a vertical carbon nanotube field effect transistor (CNTFET) and a method of manufacturing the same:
B. Chandra et al., "Stable Charge-Transfer Doping of Transparent Single-Walled Carbon Nanotube Films (SW-CNT)," Chem. Mater., Volume 22, No. 18, published on the Web Sep. 1, 2010, pp 5179-5183, reports an alternative doping scheme that utilizes a single-electron oxidant (triethyloxonium hexachloroantimonate) to effectively dope cut single-walled carbon nanotube (SWCNT) films.
J. Chen et al., "Self-aligned carbon nanotube transistors with charge transfer doping," Appl. Phys. Lett., Volume 86, 2005, 123108, reports a charge transfer p-doping scheme that utilizes one-electron oxidizing molecules to obtain stable, unipolar carbon nanotube transistors with a self-aligned gate structure:
H. Shiozawa et al., "Screening the Missing Electron: Nano-chemistry in Action," Phys. Rev. Lett. 102, 2009, 046804, describes electron doping through the 1D van Hove singularity of single-walled carbon nanotubes, realized via a chemical reaction of an encapsulated organo cerium compound, $CeCp_3$:
T. Durkop et al., "Extraordinary Mobility in Semiconducting Carbon Nanotubes," Nano Letters, Vol. 4, No. 1, 2004, pp. 35-39 describes semiconducting carbon nanotube transistors with channel lengths exceeding 300 microns:
T. Hemraj-Benny et al., "Interactions of Lanthanide Complexes with Oxidized Single-Walled Carbon Nanotubes," Chem. Mater., Volume 16, No. 10, Published on the Web Apr. 9, 2004, describes oxidized, cut single-walled carbon nanotubes (SWCNTs) reacted with lanthanide salts consisting of Eu, La, and Tb:

SUMMARY OF THE INVENTION

The present invention provides compounds, compositions, structures, articles of manufacture and processes that address the foregoing needs to not only provide advantages over the related art, but also to substantially obviate one or more of the foregoing and other limitations and disadvantages of the related art.

To achieve these and other advantages, and in accordance with the purpose of the invention as embodied and broadly described herein, the invention comprises the use of Ce (IV) salts as effective dopants for both carbon nanotubes and graphene.

BRIEF DESCRIPTION OF THE DRAWINGS

The accompanying graphs (plots) and drawings set out the invention, and are incorporated in and constitute a part of this specification and are included to illustrate various embodiments of the invention, and together with this specification also serve to explain the principles of the invention.

DETAILED DESCRIPTION OF THE INVENTION

Figure 1:
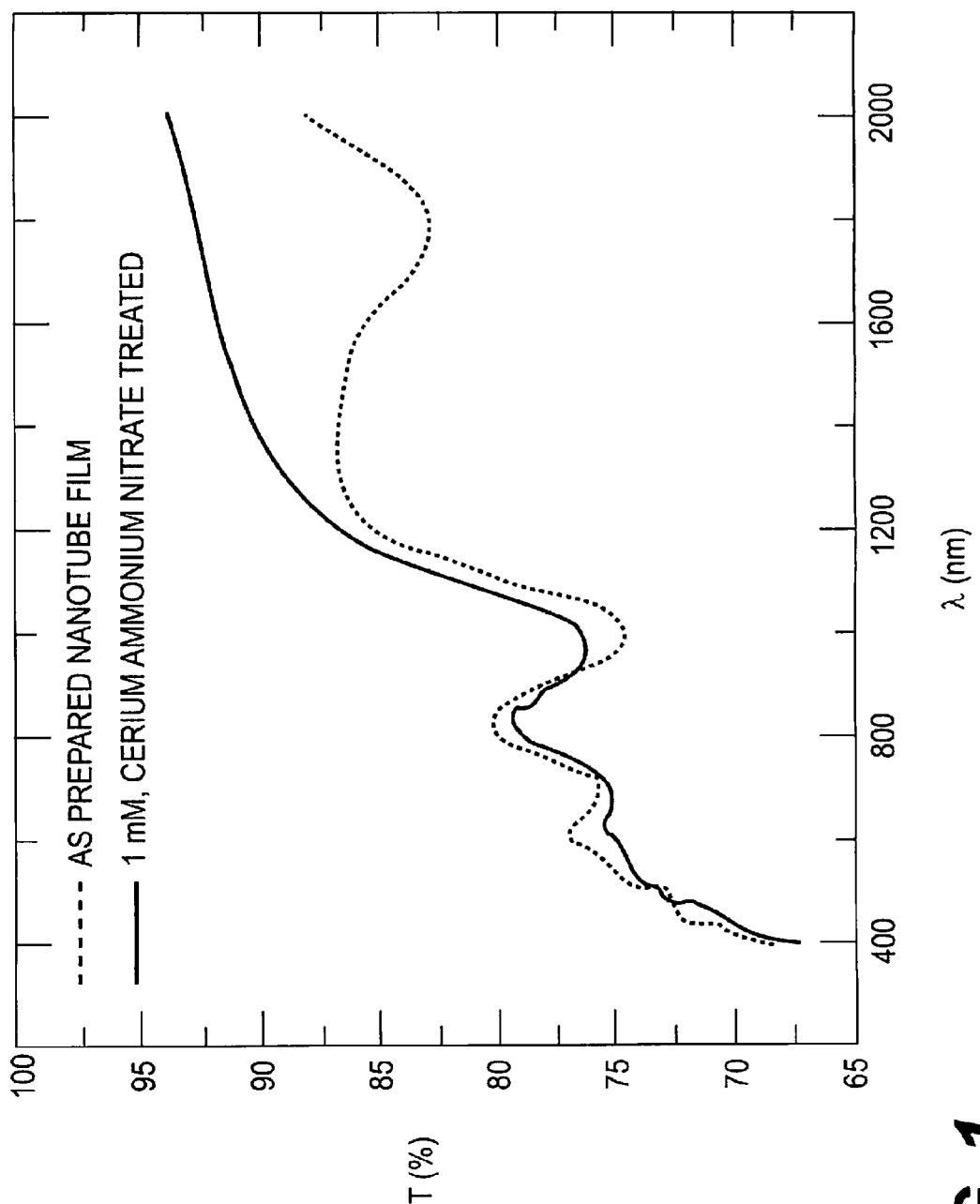
FIG. 1 comprises a UV-vis plot of a nanotube film and the same nanotube film treated with a 1 mM Ce (IV) ammonium nitrate aqueous solution, where the absicissa comprises the wavelength λ in nano meters (nm) of UV light directed at each film and the ordinate, the UV transparency T(%) of each film to that UV light.
Figure 2:
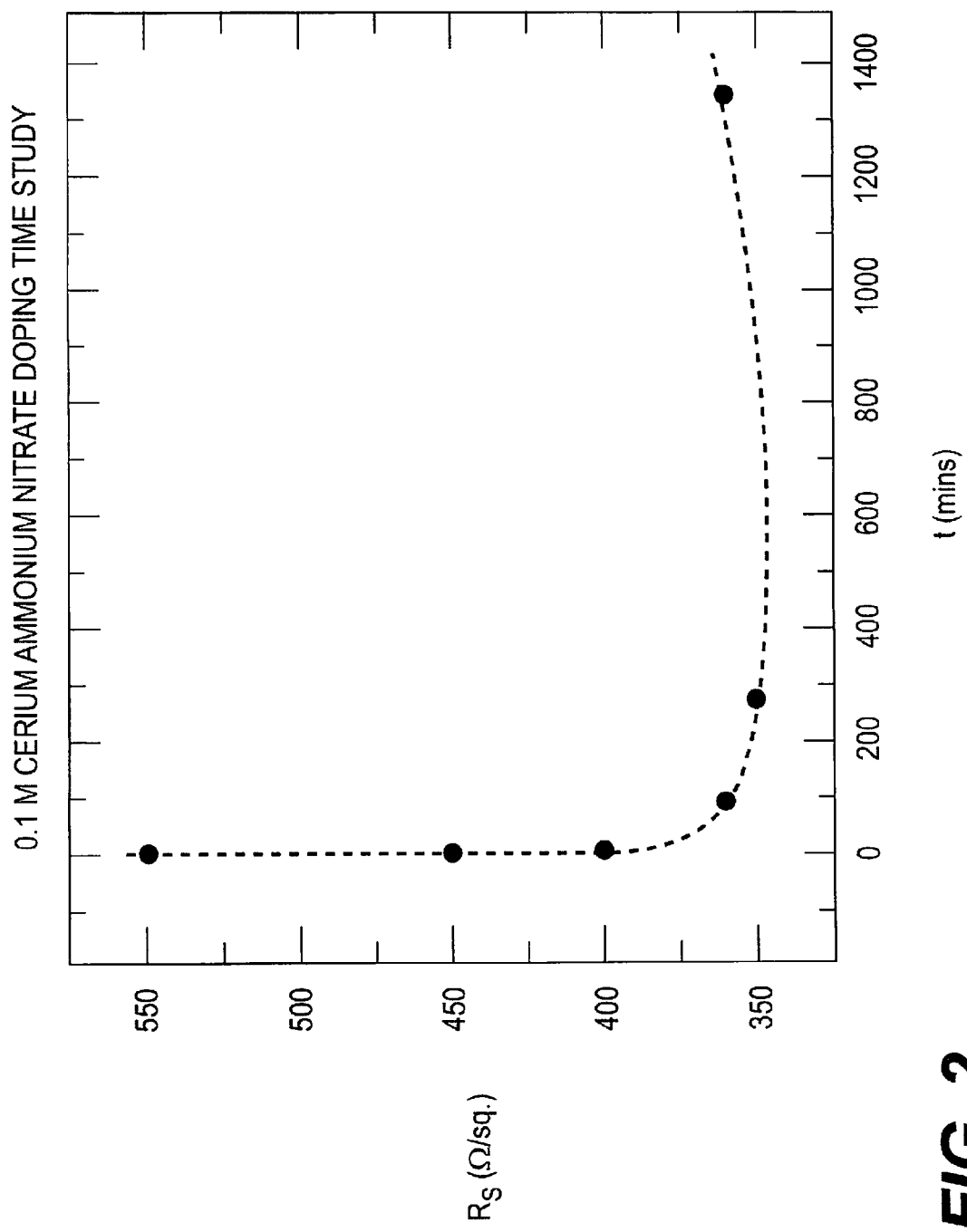
FIG. 2 comprises a plot of the results of a doping study of 0.1 m Ce (IV) nitrate doped CNT film (graphene film) over a period of 0 to 1400 minutes where the absicissa comprises the time in minutes, t (mins), for the doping treatment, and the ordinate the resistivity, $R_s$ ($\Omega$/sq.), of the film after doping.

To achieve these and other advantages, and in accordance with the purpose of this invention as embodied and broadly described herein, the following detailed embodiments comprise disclosed examples that can be embodied in various forms.

The specific processes, compounds, compositions, and structural details set out herein not only comprise a basis for the claims and a basis for teaching one skilled in the art to employ the present invention in any novel and useful way, but also provide a description of how to make and use this invention. Not only do the written description, claims, abstract of the disclosure, and the drawings that follow set forth various features, objectives, and advantages of the invention and how they may be realized and obtained, but these features, objectives, and advantages will also become apparent by practicing the invention.

Ce (IV) salts, for example Ce (IV) ammonium nitrate (CAN), Ce (IV) ammonium sulfate, Ce (IV) methylsulfonate and Ce (IV) trifluoromethanesulfonate, all are very effective oxidizing agents which undergo reduction by one-electron transfer with an electron rich substrate. These Ce (IV) salts as effective dopants for both carbon nanotubes and graphene, and are mostly commercially available. Some are prepared in one step from commercially available compounds and all are soluble in water to a large extent.

Nitrite, $-NO_2$, or hyponitrite, $-NO$, salts can be substituted or used in lieu of the the Ce (IV) ammonium nitrate (i.e., the $-NO_3$ salt). This aspect the invention broadly comprises the use of Ce (IV) salts of a nitrogen oxide acid, or Ce (IV) ammonium salts of a nitrogen oxide acid in the process of the invention and the products obtained using this process. The invention also comprises using mixtures of the foregoing salts.

Similarly, a salt of a sulfur oxide acid could be substituted for or used in lieu of the Ce (IV) ammonium sulfate. The cations of these salts are well known in the art, but in one embodiment of the invention we employ ammoniums cations. This aspect of the invention broadly comprises the use of Ce (IV) salts of a sulfur oxide acid, or Ce (IV) ammonium salts of a sulfur oxide acid in the process of the invention and the products obtained using this process. The invention also comprises using mixtures of the foregoing salts. Examples of these acids which are used to form these salts, and in one embodiment, the corresponding ammonium salts comprise inter alia:

sulfurous acid, $H_2SO_3$;
ammonium sulfite, $(NH4)_2SO_3$;
sulfuric acid, $H_2SO_4$;
ammonium sulfate, $(NH4)_2SO_4$;
thiosulfuric acid, $H_2S_2O_3$;
ammonium thiosulfate, $(NH4)_2SO_3$;
dithionus acid, $H_2S_2O_4$;
ammonium hyposulfite $(NH4)_2SO_4$;
metasulfinic acid, $H_2S_2O_5$;
ammonium metasulfite, $(NH4)_2SO_5$;
hyposulfuric acid, $H_2S_2O_6$;
ammonium hyposulfate, $(NH4)_2SO_6$;
pyrosulfuric acid, $H_2S_2O_7$;
ammonium pyrosulfate, $(NH4)_2SO_7$;
persulfuric acid, $H_2S_2O_8$; and
ammonium persulfate, $(NH4)_2SO_8$ The Ce (IV) salts, Ce (IV) methylsulfonate and Ce (IV) trifluoromethanesulfonate, generally comprise specific salts that may be employed according to the invention although similar salts can be used including those comprising Ce (IV) lower alkyllsulfonate and Ce (IV) trihalo lower alkanesulfonate. The lower alkyl group in addition to the methyl group comprises those groups that contain from 1 to about 5 carbon atoms, including isomeric configurations thereof, such as methyl, ethyl, propyl, isopropyl, butyl, isobutyl, propyl, isopropyl and the like. The lower alkane groups in addition to the methane group, comprise those groups that contain from 1 to about 5 carbon atoms, including isomeric configurations thereof such as methane, ethane, propane, isopropane, butane, isobutane, pentane, isopentane and the like, where the alkane group can be fully substituted, e.g., perfluoro methane, or partially substituted, e.g., difluoromethane, difluoropentane, and the like. The halogen of the Ce (IV) trihalo lower alkanesulfonate can be any one of fluorine, chlorine, bromine, or iodine.

Additionally, salts of an organo sulfur acid could be substituted for or used in the process of the invention in lieu of or as substitutes for the organo sulfonates, Ce (IV) methylsulfonate and Ce (IV) trifluoromethanesulfonate to obtain the products using this process. The invention also comprises using mixtures of these salts and comprise inter alia:

Sulfonates, $(R)(OH)SO_2$
Sulfinites, $(R)(OH)SO$;
Sulfones, $(R)(RO)SO$, and $(R)(R)SO_2$;
Sulfoxides, $(R)(R)SO$;
Sulfonium compounds, $(R)(R)(R)SX$;
Sulfinates, $(R)(R)SX_2$, where "R" can be the same or different and comprises a lower alkyl group or a substituted lower alkyl group, such as a halogen substituted lower alkyl having from 1 to about 5 carbon atoms and the isomers thereof such as isopropyl, isobutyl, isopentyl and the like, and "X" comprises an anion well known in the art and can be the same or different for the compounds that include the radical "$X_2$."

The process of doping CNTs (either a single nanotube in a FET or other devices, or as a thin film on a substrate) is achieved simply by immersion of the substrate in dilute solution of Ce (IV) salts in water. After a certain period of time the substrate is removed and washed with water to remove excess salt and dried to provide a doped CNT thin film. The same procedure is also effective for graphene. The substrates comprise glass, quartz, silicon, silicon oxide, plastic materials such as polyimides, polyamides, epoxies, phenolics, polyvinyl chlorides, polyvinyl chloride copolymers and the like, and flexible substrates.

A second approach for doping CNTs comprises adding very dilute solutions of these Ce (IV) salts in water to an aqueous dispersion of carbon nanotubes and monitor the extent of doping on UV-vis spectra obtained from a film of the CNTs deposited on a quartz substrate.

FIG. 1 shows the UV-vis spectra of doped CNTs and also the change in surface resistivity of these films before and after doping using the method described above, i.e., doping a thin film of CNTs on a quartz substrate.

Combinations of any of the foregoing Ce (IV) salts are also used in practicing this invention.

Figure 4:
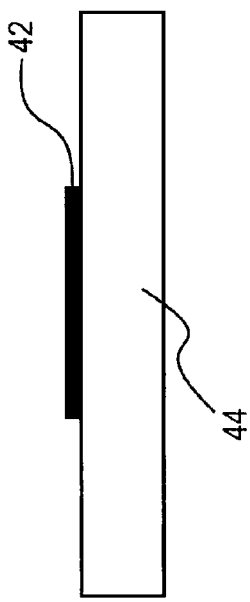
FIG. 4 comprises a side elevation in cross-section illustrating a substrate supporting graphene processed according to the invention.
Figure 3:
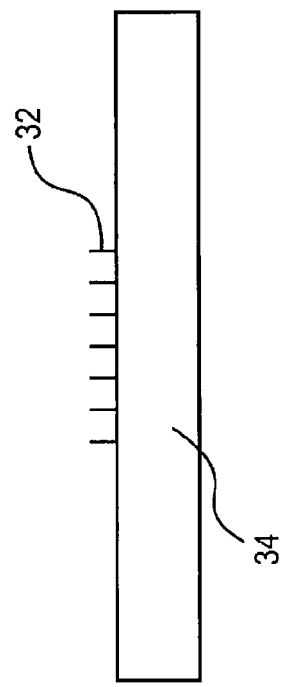
FIG. 3 comprises a side elevation in cross-section illustrating a substrate supporting CNTs processed according to the invention.

In FIG. 3 we illustrate a side elevation in cross-section 30 of CNTs 32 processed according to the invention on a substrate 34, and in FIG. 4, a side elevation in cross-section 40 of graphene 42 processed according to the invention on a substrate 44. These substrates comprise those described above and substrates well known in the art.

The "thin" CNT film or "thin" graphene film is any where from about 2 nm to about 100 nm thick or from about 2 nm to about 50 nm thick.

The Ce (IV) salts of this invention dissolved in water are at concentrations of about 1 mM to about 100 mM.

In addition to dissolving the Ce (IV) salts of this invention in water, organic co-solvents may also be used with water and include ethanol, methanol, acetonitrile, dmf and the art-known equivalents thereof, in an amount of about 5% to about 25% by weight of the water. Combinations of these solvents are also employed in practicing the invention.

In another aspect of the invention, and in order to further describe the foregoing combining process and compound production, we define the invention as comprising a product produced by the process of combining these Ce (IV) salts with CNTs and graphene as set out herein.

CNTs are produced according to processes well known in the art such as those described by Dimitrakopoulus and Georgiou U.S. Pat. No. 7,842,554 and the references cited therein. The properties of graphene, its uses, and methods for its manufacture are also well known in the art as exemplified by the following publications and the references cited therein:

Geim, A. K. and Novoselov, K. S. (2007), "The rise of graphene." *Nature Materials* 6 (3): 183-191:
Geim A: (2009): "Graphene: Status and Prospects": *Science* 324 (5934): 1530:
Liying Jiao, Li Zhang, Xinran Wang, Georgi Diankov & Hongjie Dai (2009). "Narrow graphene nanoribbons from carbon nanotubes". *Nature* 458 (7240): 877:
Lemme, M. C. et al. (2007). "A graphene field-effect device". *IEEE Electron Device Letters* 28 (4): 282:
Bourzac, Katherine (2010-Feb.-5). "Graphene Transistors that Can Work at Blistering Speeds". *MIT Technology Review*:
IBM shows off 100 GHz graphene transistor-Techworld.com. News.techworld.com. Retrieved on 2010-Dec.-10:
Lin et al.; Dimitrakopoulos, C; Jenkins, K A; Farmer, D B; Chiu, H Y; Grill, A; Avouris, P (2010). "100-GHz Transistors from Wafer-Scale Epitaxial Graphene". *Science* (Science) 327 (5966): 662:
Wang, X.; Li, X.; Zhang, L.; Yoon, Y.; Weber, P. K.; Wang, H.; Guo, J.; Dai, H. (2009). "N-Doping of Graphene Through Electrothermal Reactions with Ammonia". *Science* 324 (5928): 768:
Traversi, F.; Russo, V.; Sordan, R. (2009). "Integrated complementary graphene inverter". *Appl. Phys. Lett.* 94 (22):
Wang, X.; et al. (2007). "Transparent, Conductive Graphene Electrodes for Dye-Sensitized Solar Cells"*Nano Letters* 8 (1): 323:

These references also illustrate various substrates that can be used.

Afzali-Ardakani, Avouris, Chen, Kimke, and Solomon, U.S. Pat. No. 7,253,431, illustrate uses for solution doped CNTs "140" in FIGS. 1-4. The CNTs produced by the process of the present invention are used substantially in the same way as a substitute for element 140 of U.S. Pat. No. 7,253,431 to form a novel article of manufacture. The graphene produced by the process of the present invention is also used substantially in the same way as a substitute for element 140 of U.S. Pat. No. 7,253,431 to form a novel article of manufacture, and can also be used substantially in the same way as the graphene materials described in the technical literature cited above to form a novel article of manufacture.

Various embodiments of our invention also comprise inter alia a process for doping a carbon material to reduce its electrical resistivity comprising combining a Ce (IV) salt dissolved in a solvent comprising water with a carbon material comprising CNT or graphene wherein the Ce (IV) salt is selected from a Ce (IV) salt of a nitrogen oxide acid, Ce (IV) salt of a sulfur oxide acid, Ce (IV) salt of a lower alkyl organo sulfur acid, or Ce (IV) salt of a substituted lower alkane organo sulfur acid. The salt may comprise Ce (IV) ammonium nitrate, Ce (IV) ammonium sulfate, Ce (IV) lower alkyllsulfonate and Ce (IV) trihalo lower alkanesulfonate, such as for example; Ce (IV) ammonium nitrate; Ce (IV) ammonium sulfate; Ce (IV) methylsulfonate; or Ce (IV) trifluoromethanesulfonate. In these processes, the carbon material may comprise a CNT or graphene. These various embodiments of our invention also comprise products made by the foregoing processes as well as articles of manufacture comprising these products on a substrate.

Throughout this specification, and abstract of the disclosure, the inventors have set out equivalents, including without limitation combinations of elements, materials, compounds, compositions, conditions, processes, structures and the like, and even though set out individually, also include combinations of these equivalents such as the two component, three component, or four component combinations, or more as well as combinations of such equivalent elements, materials, compositions conditions, processes, structures and the like in any ratios or in any manner.

Additionally, the various numerical ranges describing the invention as set forth throughout the specification also includes any combination of the lower ends of the ranges with the higher ends of the ranges, and any single numerical value, or any single numerical value that will reduce the scope of the lower limits of the range or the scope of the higher limits of the range, and also includes ranges falling within any of these ranges.

The terms "about," "substantial," or "substantially" as applied to any claim or any parameters herein, such as a numerical value, including values used to describe numerical ranges, means slight variations in the parameter. In another embodiment, the terms "about," "substantial," or "substantially," when employed to define numerical parameter include, e.g., a variation up to five percent, ten percent, or 15 percent, or somewhat higher.

All scientific journal articles and other articles, including internet sites, as well as issued and pending patents that this written description or applicants' Invention Disclosure Statements mention including the references cited in such scientific journal articles and other articles, including internet sites, and such patents, are incorporated herein by reference in their entirety and for the purpose cited in this written description and for all other disclosures contained in such scientific journal articles and other articles, including internet sites as well as patents and the aforesaid references cited therein, as all or any one may bear on or apply in whole or in part, not only to the foregoing written description, but also the following claims, and abstract of the disclosure.

Although the inventors have described their invention by reference to some embodiments, other embodiments defined by the doctrine of equivalents are intended to be included as falling within the broad scope and spirit of the foregoing written description, and the following claims, and abstract of the disclosure.

We claim:

1. A process for doping a carbon material to reduce its electrical resistivity comprising combining a Ce (IV) salt dissolved in a solvent comprising water with a carbon material comprising CNT or graphene wherein said Ce (IV) salt is selected from a Ce (IV) salt of a nitrogen oxide acid, Ce (IV) salt of a sulfur oxide acid, Ce (IV) salt of a lower alkyl organo sulfur acid, or Ce (IV) salt of a substituted lower alkane organo sulfur acid.

2. The process of claim 1 wherein said salt comprises Ce (IV) ammonium nitrate, Ce (IV) ammonium sulfate, Ce (IV) lower alkyllsulfonate and Ce (IV) trihalo lower alkanesulfonate.

3. The process of claim 1 wherein said Ce (IV) salt comprises Ce (IV) ammonium nitrate.

4. The process of claim 1 wherein said Ce (IV) salt comprises Ce (IV) ammonium sulfate.

5. The process of claim 1 wherein said Ce (IV) salt comprises Ce (IV) methylsulfonate.

6. The process of claim 1 wherein said Ce (IV) salt comprises Ce (IV) trifluoromethanesulfonate.

7. The process of claim 1 wherein said carbon material comprises a CNT.

8. The process of claim 1 wherein said carbon material comprises graphene.

9. A product made by the process of claim 1.

10. A product made by the process of claim 7.

11. A product made by the process of claim 8.

12. An article of manufacture comprising the product of claim 9 on a substrate.

13. An article of manufacture comprising the product of claim 10 on a substrate.

14. An article of manufacture comprising the product of claim 11 on a substrate.

15. A product made by the process of claim 2.

16. A product made by the process of claim 3.

17. A product made by the process of claim 4.

18. A product made by the process of claim 5.

19. A product made by the process of claim 6.

20. An article of manufacture comprising the product of claim 15 on a substrate.

* * * * *